United States Patent
Ahler et al.

(10) Patent No.: US 8,998,343 B2
(45) Date of Patent: Apr. 7, 2015

(54) METHOD FOR DETERMINING THE POSITION OR LOCATION OF PLANT COMPONENTS IN MINING EXTRACTING PLANTS AND EXTRACTING PLANT

(75) Inventors: Marco Ahler, Mulheim a.d.R. (DE); Sascha Stelter, Dorsten (DE); Andreas Westphalen, Dortmund (DE); Stefan Hengstler, Lunen (DE); Simon Pauli, Hannover (DE); Dennis Dehmel, Lunen (DE); Detlef Hahn, Lunen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 153 days.

(21) Appl. No.: 13/579,903

(22) PCT Filed: Feb. 18, 2011

(86) PCT No.: PCT/IB2011/050685
§ 371 (c)(1),
(2), (4) Date: Aug. 17, 2012

(87) PCT Pub. No.: WO2011/101812
PCT Pub. Date: Aug. 25, 2011

(65) Prior Publication Data
US 2012/0319453 A1    Dec. 20, 2012

(30) Foreign Application Priority Data
Feb. 19, 2010    (DE) .......................... 10 2010 000 481

(51) Int. Cl.
*E21C 35/08* (2006.01)
*E21D 23/12* (2006.01)
(Continued)

(52) U.S. Cl.
CPC ............... *E21D 23/12* (2013.01); *E21C 35/08* (2013.01); *E21C 35/12* (2013.01); *G01C 15/00* (2013.01)

(58) Field of Classification Search
CPC ........................................................ E21C 35/08
USPC .................................... 299/1.6, 1.7, 1.4, 1.05
See application file for complete search history.

(56) References Cited

U.S. PATENT DOCUMENTS 4,238,828 A * 12/1980 Hay et al. ........................ 299/1.8
4,482,960 A * 11/1984 Pryor .............................. 701/28
(Continued)

FOREIGN PATENT DOCUMENTS

DE      198 40 049 A1    4/2000
DE   10 2009 048 154 A1    4/2011
(Continued)

*Primary Examiner* — John Kreck
(74) *Attorney, Agent, or Firm* — Foley & Lardner LLP

(57) ABSTRACT

A method and system for determining the position and/or location of plant components of a mining extracting plant, which includes at least one face conveyor, a shield-type support system having a plurality of shield-type support frames and an extracting machine, the position/location of at least one plant component is determined by an evaluation system including a detection unit. To determine the location/position of at least one plant component even in the case of a dynamic mineral mining process, the detection unit includes an image sensor, by way of which at least four object points, which are at a predetermined spacing to each other and are detectable within the optical wavelength range, of at least one measuring object associated with one of the plant components, are detected and the position/location of the plant component can be determined from the projection of the object points detected by the image sensor.

27 Claims, 4 Drawing Sheets

(51) Int. Cl.
*E21C 35/12* (2006.01)
*G01C 15/00* (2006.01)

(56) References Cited

U.S. PATENT DOCUMENTS

| | | | | |
|---|---|---|---|---|
| 4,968,978 | A | * | 11/1990 | Stolarczyk ............... 340/854.6 |
| 5,079,640 | A | * | 1/1992 | Gfrerer ..................... 398/109 |
| 5,110,187 | A | | 5/1992 | Heintzmann et al. |
| 6,411,371 | B1 | | 6/2002 | Hinderling et al. |

FOREIGN PATENT DOCUMENTS

| | | |
|---|---|---|
| EP | 0 267 181 A1 | 5/1988 |
| EP | 1 276 969 B1 | 12/2006 |
| GB | 2 027 548 A | 2/1980 |

\* cited by examiner

METHOD FOR DETERMINING THE POSITION OR LOCATION OF PLANT COMPONENTS IN MINING EXTRACTING PLANTS AND EXTRACTING PLANT

The invention relates to a method for determining the position and/or location of plant components of a mining extracting plant, in particular of a coal mining extracting plant, which as plant components comprises at least one face conveyor for removing extracted materials, a shield-type support system having a plurality of shield-type support frames for keeping a face open, displacing devices for moving the face conveyor and the shield-type support in active operation and an extracting machine that is moveable along the face conveyor, the position and/or location of at least one plant component being determined by way of an evaluation system that includes at least one detection unit. The invention also relates to an extracting plant for mining, in particular a coal mining extracting plant, having a face conveyor for removing extracted materials, a shield-type support system having a plurality of shield-type support frames for keeping a face open, displacing devices for moving the face conveyor and the shield-type support system in active operation and an extracting machine as plant components of the extracting plant, an evaluation system that includes at least one detection unit being provided for determining the position and location of at least one plant component of the extracting plant. The invention also relates to a method and to an extracting plant adapted for the accomplishment of the method, by means of which a change in the location or a change in the position of a plant component in relation to the surrounding area can be detected in order, where applicable, to be able to draw conclusions from this regarding, for example, the migrating of the face.

BACKGROUND OF THE INVENTION

Modern mines for the underground mining (extraction) of minerals in faces shift more and more work to the surface. This includes, above all, the monitoring and also control of the extraction process. In order to be able to visualize the extraction process by way of the extracting plant on the surface and to optimize the extraction process, the most precise knowledge possible is required of the respective current position of as many plant components as possible, such as, in particular, of the face conveyor with, where applicable, a mounted machine control unit for an extracting machine, of the extracting machine itself and, where applicable, also of the support frames of a shield-type support system, by means of which the face or the underground stope is kept open and it is possible to displace the plant components of the extracting plant in the extracting or mining direction. As through the dynamic process, e.g. when extracting coal, there is a change in the position and location both of the technical extracting and conveying systems in the face and that of the plant components positioned in the roads, an effective solution for measuring and determining the position, where possible, of all these plant components in three-dimensional space (3D) and/or for measuring and determining the location of the plant components in relation to each other has long been looked for.

EP 1 276 969 makes known entraining with the extracting machine a measuring system having an inertial navigation system in order to obtain, in two-dimensional space, a determining of a position of the rail guide of the face conveyor and of the extracting machine guided thereon. Drive signals for displacing devices are to be derived in turn from the positional data recorded with the inertial system in order to obtain control of the extracting plant or of the guide means in 3D space. Using the inertial navigation system, changes in location are determined with reference to an initial or starting point, it being possible, whenever a starting point is known in mine surveyor's terms, to also determine absolute 3D coordinates arithmetically from the relative movements determined with the inertial navigation system. The measurement data prepared by the inertial navigation system is coupled to the movement of the extracting machine.

For a shield-type support frame, the mounting of inclination detectors on the shield-type support frame has long been known, such as for example on its shield caps, fracture shield, control levers or runner, by means of which inclination detectors the relative location of the shield components to each other or also the absolute location of the shield components is determined. In DE 10 2007 035 848 B4 a multi-dimensional detector with acceleration sensors is proposed as inclination sensor in order to detect, in conjunction with a self-advancing sensor, the space/time coordinates of the shield-type support frame in relation to the face conveyor and to improve the automation of the mining of a coal face.

A method and device for optical distance measuring is known for geodetic surveying (cf. DE 198 40 049). A triangulation method is frequently employed for land surveying where sensors are used that are also designated as triangulation sensors or reflection light scanners. A light emitter emits light that after reflection at an object by means of a lens is supplied to a locally resolving, mainly optoelectronic image sensor in order to draw conclusions as to the distance of the object from the known geometry of the sensor.

SUMMARY OF THE INVENTION

It is an object of the invention to create a method and an evaluation system for extracting plants, by way of which even in the case of a dynamic mineral mining process where there is a change in the absolute location and the relative location of the technical plant components brought about by the progress of the mining and/or by wear, the location and/or position of at least one plant component, the position and location of specified machine parts of the plant components or changes in the location or changes in the position in relation to the surrounding area can be determined.

This object and others is achieved in accordance with the basic concept of the invention with the method for determining the location or position in that at least one detection unit includes an image sensor, by way of which at least four object points, which are at a predetermined spacing from each other and are detectable within the optical wavelength range, of at least one measuring object associated with one of the plant components are detected, wherein the position and/or location of the plant component, or at least of one specific machine part of the plant component with which the measuring object is associated, is determined by way of the evaluation system from the projection of the object points detected by way of the image sensor.

The method according to the invention utilizes the fact that in the case of a measuring object, which has at least four clearly-defined object points that are at a predetermined or previously known fixed spacing from each other and which, for example, is attached to a plant component or a specific machine part of one of the plant components such as, for example, the spill plate of a face conveyor, the shield cap of a shield or the machine frame of an extracting machine, the location, i.e. the tilting, and/or the position, i.e. the spacing, of the plant component can be reconstructed in three-dimensional space at least in relation to the image sensor or to the detection unit from the projection of the object points of the measuring object in at least one two-dimensional image plane that is detectable by way of the image sensor. Numerical solution methods, for example, can be used to reconstruct the spatial position from the projection of the object points.

The main area of application of the method according to the invention is formed by the determining of the location and the position of the face conveyor or of the extracting machine in relation to the shield-type support system along the face. As the face conveyor normally includes the guides or guide rails for the extracting machine, where applicable, information on the location and position of just one of the two plant components is sufficient. This information makes it possible, for example, to avoid a collision between an extracting machine that can be driven in the face, such as, for example, a shearer loader with relatively large cutting rollers, and the shield cap of a shield-type support frame. To this end, it is possible to realize or vary the method in different alternatives according to the invention.

According to a possible development, the object points of at least one or precisely one measuring object entrained with the extracting machine can be detected by way of a plurality of detection units located distributed along the shield-type support system in a fixed manner.

In the case of this first method variant, at least one measuring object with at least four object points is entrained with the extracting machine, whilst on a plurality of shield-type support frames located along the shield-type support system at a spacing from each other is located in each case at least one detection unit with image sensor in order to detect the measuring object or the object points of the measuring object by way of the image sensor as the extracting machine is moved past. The measuring object can, as explained in more detail below, for example, be formed by four active radiation sources such as light-emitting diodes LEDs, but also by clearly defined points on the extracting machine. The more shield-type support frames that are provided with a detection unit, the more accurately it is possible to detect and determine the course of the face in relation to the shield-type support system. The detection units can be located at regular or irregular spacings and a measuring object can be detected optically with the at least four object points by means of one detection unit, but also by means of a plurality of detection units. It would also be possible to entrain a plurality of measuring objects with the extracting machine in order to detect two or more evaluation pairs simultaneously as it is moved past, for example by means of a plurality of detection units located on the respective shield-type support frame, via which evaluation pairs the position or location of the face conveyor or of the extracting machine can then be determined in relation to the shield-type support system. A possible method variant here could provide that the measuring object is formed by a display of a display device or control device located on the extracting machine. The display of such a display device in the majority of cases forms a rectangular surface that stands out in a fully contrasting manner from the wall of the extracting machine and from other machine parts of the individual plant components. The entire display would consequently form a light field or, for example, however, a particularly bright light point, forming in each case one of the object points to be scanned with the image sensor, would be provided in the corners of the display. Insofar as a plurality of display devices or control devices with a plurality of displays is present on the extracting machine, these could be scanned either by way of the same detection unit or by way of different detection units. In the case of a rectangular display, for example, the image sensor, depending on the spacing and tilting of the extracting machine, would detect a projection of the rectangular measuring object surface and from the size of the projection it is possible to detect the spacing, i.e. the position of the display and consequently of the extracting machine in relation to the detection unit and also the degree of tilting, i.e. the position, of the measuring object.

Another method variant can provide that the object points of at least one or precisely one measuring object moved along the face conveyor independently of the extracting machine are detected by way of a plurality of detection units located distributed along the shield-type support system in a fixed manner. Such a measuring object, moved independently of the extracting machine, can be entrained, for example, with the face conveyor or can also comprise a measuring object that is moved back and forth separately from the extracting machine. It is obvious that the method variants could also be combined, it also being possible, where applicable, for the same detection unit to be used in each case for detecting a measuring object on the extracting machine and for detecting a measuring object that is moved independently of the extracting machine.

Another method variant can be to detect the object points of measuring objects located distributed along the face conveyor in a fixed manner by way of a plurality of detection units located distributed in a fixed manner along the shield-type support system. For this variant, for example, each shield-type support frame of the shield-type support system or also only an arbitrary number, in principle, of shield-type support frames can be provided with one or with a plurality of detection units that, in their turn, detect the object points of one or of a plurality of measuring objects, which are mounted in each case, for example, on the associated trough pan of the face conveyor.

As an alternative to this or in addition, the object points of a plurality of fixed measuring objects located distributed along the shield-type support system can be detected by way of at least one or by way of precisely one detection unit entrained with the extracting machine. In the case of this method variant, the detection unit is consequently entrained with the extracting machine, whilst fixed measuring objects located distributed on the shield-type support are scanned by way of the moved detection unit. In this case too it depends only on the desired resolution and accuracy as to whether each shield-type support frame or only individual shield-type support frames of the shield-type support system are provided with at least one measuring object. When running this method, for example, the display of the support control device of each shield-type support frame could also form the measuring object that is then detected by way of the detection unit moving past together with the extracting machine to determine the relative location between shield-type support frame or shield-type support system on the one side and extracting machine on the other. Instead of entraining the detection unit with the extracting machine, it could also be moved independently of the extracting machine.

In addition, the object points of a plurality of fixed measuring objects located distributed along the shield-type support system could also be detected by way of a plurality of detection units located distributed along the face conveyor in a fixed manner. In this method variant too, the fixed measuring object could also be created, for example, by the display of a support control device of each shield-type support frame, but also by the visual signal from light-emitting diodes that are mounted, for example, as corner points of a rectangle on a specified machine part. The object points of the measuring object can be formed by light-emitting diodes that radiate, for example, within the visible wavelength range. The object points can be formed by a display or also by other radiation sources or LEDs, such as, for example, LEDs radiating within the UV wavelength range or IR wavelength range, as long as it is possible to scan the object points with an optical image sensor such as, for example, a two-dimensional matrix sensor or line sensor.

The abovementioned object is achieved with an extracting plant in that the at least one detection unit includes an image sensor, and that at least one of the plant components or a specific machine part of one of the plant components has associated therewith a measuring object that comprises at least four object points, which are at a predetermined spacing from each other and are detectable within the optical wavelength range by way of the image sensor. At least one detection unit with image sensor is consequently located on a generic extracting plant, by way of which image sensor object points, which are detectable within the optical wavelength range such as, for example, LED radiation sources or a display or the like of another plant component, are detectable.

The evaluation system should preferably include image processing software by way of which the position or location of the plant components is determinable from the projection of the object points detected by way of the image sensor.

To minimize the number of detection units necessary, in the case of a particularly advantageous development of the method or of an extracting plant according to the invention, it can be provided that the detection units or the image sensor are pivotable or are pivoted, or that an optical system associated in each case with the image sensor of the detection units is pivotable or is pivoted. A pivotable detection unit or a pivotable lens can be used to scan either a plurality of fixed measuring objects with one detection unit or, in particular in the case of a moved measuring object, to scan the measuring object with the same detection unit at different positions as the extracting machine moves past. Insofar as fixed measuring objects are located, for example, in each case on the respective trough pan of the face conveyor that is connected via a displacing beam to the associated shield-type support frame, it would also be possible with a pivotable detection unit to scan measuring objects that are located on adjacent trough pans. Insofar as the pivotable detection unit is located on the face side, consequently, for example, on the face conveyor, measuring objects on a plurality of shield-type support frames can be scanned with one detection unit. The pivotability of the detection unit or of the associated lens could also be used to locate on one plant component a plurality of measuring objects that are scanned one after the other by means of a single detection unit.

The object points of the measuring object preferably comprise radiation sources, in particular LEDs, that emit within the optical wavelength range and are positioned at a predetermined spacing from each other. To minimize the time and money spent subsequently on computation, it is particularly advantageous when the LEDs are at a fixed spacing from each other and extend over, for example, a measuring field with a simple geometric form such as, for example, a rectangle. The greater the spacing selected here between the individual measuring objects, the better the spatial resolution of the evaluation system can be. To ensure a fixed spacing between the individual object points of a measuring object, it is in particular advantageous when all object points of a measuring object are located distributed on the same machine part of one of the plant components. In view of the large surface available, such a specific machine part could be, in particular, the spill plate of a trough pan of the face conveyor, the housing wall of a shearer loader or the cap or the fracture shield of a shield-type support frame.

To increase the accuracy of the system, a plurality of detection units can be located at different positions in each case on a shield-type support frame of the shield-type support system or on a trough pan of the face conveyor, at least two of the detection units then being determined, according to one variant, for detecting the same measuring object. As an alternative, a plurality of measuring objects or a plurality of detection units can be located at different positions in each case on a shield-type support frame of the shield-type support or on a trough pan of the face conveyor, in each case one measuring object and one detection unit of the measuring objects and the detecting units form an evaluation pair. In the case of this variant, it is possible, in particular, to work with non-mobile detection units. If a plurality of measuring objects is to be scanned with one detection unit, a pivotal detection unit or a detection unit with pivotable lenses is particularly suitable.

The location coordinates and/or the position coordinates of one of the plant components or of a specific machine part of the plant components, are determined, in iteration steps, by means of the evaluation device from the projections of the object points detected by way of the image sensors. In this case, the location coordinates or position coordinates of the face conveyor are preferably determined, in particular calculated.

More preferably, at least one plant component, preferably the face conveyor or the support frames, can have associated therewith at least one inclination detector to detect not only the relative location, for example, of the face conveyor in relation to the shield-type support system, but also to determine the absolute location. The signals of the inclination detector could also replace the optical evaluation system and it could just be used, for example, to determine the position if the inclination detector is associated simultaneously with the respective plant component and the face conveyor. Two-dimensional or three-dimensional inclination detectors that include an acceleration sensor for the respective dimension are particularly suitable for this, corresponding inclination detectors with acceleration sensors being known in the meantime in numerous technical areas including underground mining.

The solution concept underlying the invention can also be used to obtain only information as to how the location or a plant component has actually changed in relation to the surrounding area. On account of the automatic advancing of the extracting plant, all plant components are moved in a regular manner. To this end, for example, the support frames must not be braced in the face or ground. Where the ground dips steeply or on account of other circumstances, this can result in a migrating of the extracting plant. To detect this, a method can be applied where there is no separate measuring object but rather the at least one detection unit includes an image sensor, by way of which at least four object points, which are at a predetermined spacing from each other and are detectable within the optical wavelength range, are detected, wherein the detection unit is associated with one of the plant components and the change in position and/or the change in location of the plant component is determined by way of the evaluation system from the projection of the object points detected by way of the image sensor. It is particularly advantageous when natural object points at the face to be extracted by way of the extracting machine are detected. It is obvious that the scanning of the object points must then take place at two points in time at which the face has not been changed by the extracting machine. For determining the change in location or the change in position, it is not necessary to know the absolute spacing between the object points, but is sufficient when, for the comparison, object points are used where there has not been any change in the spacing between them, and is consequently fixedly predetermined.

In the case of an extracting plant adapted correspondingly for this method, it is provided according to the invention that an evaluation system including at least one detection unit is provided for determining the position or location or the change in position or change in location of at least one plant component of the extracting plant, the at least one detection unit including an image sensor that is located on one of the plant components, and that by way of the image sensor, at least four object points, which are at a fixedly predetermined spacing from each other and are detectable within the optical wavelength range, are detectable. It is especially advantageous when the evaluation system includes image processing software, by way of which the change in the position and/or change in the location of the plant component is determinable from the projection of the object points detected by way of the image sensor. Also in the case of the extracting plant, natural object points, in particular, can be detected at the face to be extracted by way of the extracting machine.

The last-mentioned method and the associated extracting plant are suited in a particularly advantageous manner to detect a migrating of the extracting plant via the determined change in position and change in location of the plant component.

These and other objects, aspects, features, developments and advantages of the invention of this application will become apparent to those skilled in the art upon a reading of the Detailed Description of Embodiments set forth below taken together with the drawings which will be described in the next section.

DETAILED DESCRIPTION OF EMBODIMENTS

Figure 1:
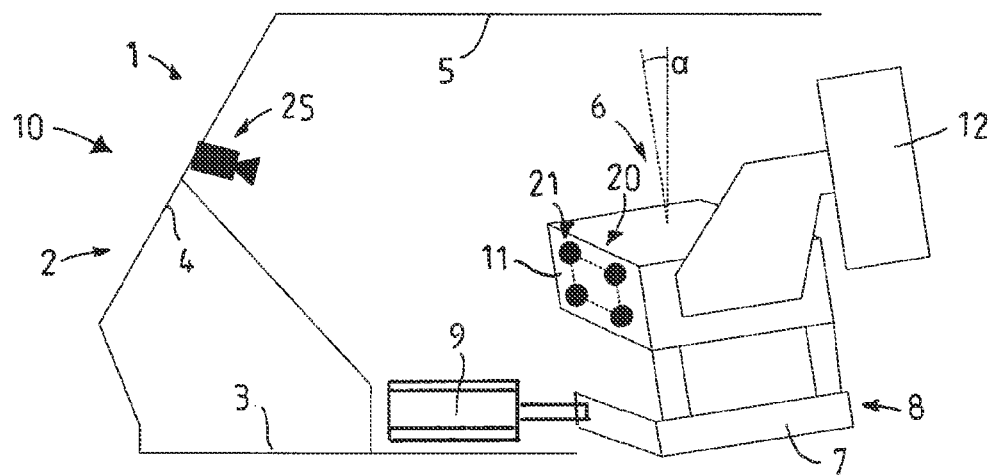
FIG. 1 shows, by way of a first exemplary embodiment, a schematic representation of an extracting plant according to the invention with an evaluation system according to the invention.

Referring now to the drawings wherein the showings are for the purpose of illustrating preferred and alternative embodiments of the invention only and not for the purpose of limiting same, reference 10 in FIG. 1 is given to an extremely highly simplified schematic representation of an extracting plant according to the invention according to a first exemplary embodiment. The extracting plant 10 includes in a known manner per se a shield-type support system 1 having a plurality of support frames 2 located next to each other in an underground face, only one single shield-type support frame 2 of the shield-type support system 1 being represented in the Figures. The shield-type support frame 2 comprises in a known manner per se a floor runner 3, a fracture shield 4 and a shield cap 5, which, where applicable, can be provided at the front with a front cap that can be folded up. Shield cap 5 and fracture shield 4 are moveable in a known manner per se in relation to the floor runner 3 and the face is kept open by way of the shield-type support system 1 in such a manner that an extracting machine 6, in this case formed by a shearer loader, can be moved back and forth in the face to mine minerals such as, for example, coal at a face. The extracting machine 6 is guided at guides of a face conveyor 8, which is indicated schematically in principle with only one trough pan 7 but which can be constructed in principle in an arbitrary manner and in a known manner per se can be formed from a plurality of corresponding trough pans arranged in rows. A pushing ram 9 is located in each case between each shield-type support frame 2 and each trough pan 7 of the face conveyor 8, by means of which pushing ram either the face conveyor 8 can be displaced relative to the shield-type support frame 2, if the shield-type support frame 2 is not braced in the face, or a shield-type support frame 2 can be advanced, as is known per se. A different spacing between the measuring object 20 and the detection unit 25 is created in dependence on the length of extension of the displacement device 9. As the basic design of such an extracting plant 10 is known per se, no further description is effected here. The invention can be used, in principle, on all types of extracting plants.

In the exemplary embodiment in FIG. 1, a measuring object 20 is located on a housing wall 11 of the extracting machine 6, namely in this case on the housing wall 11 located opposite and facing away from the cutting rollers 12 and facing the shield-type support frame 2, the measuring object including four corner points as object points 21 in each case formed, for example, by light-emitting diodes. The measuring object forms a rectangular measuring field. The light-emitting diodes form the object points 21 of the measuring object 20 and the light-emitting diodes comprise radiation sources that can be detected by way of a suitable detection unit 25. In FIG. 1, preferably purely for illustrative purposes, the detection unit 25 is represented as a video camera, which, in a known manner per se, includes a lens and an image sensor such as, for example, a CCD image sensor, that can be located in the detection unit housing. However, the detection unit 25 can also be designed in a completely different manner, insofar as it is suitable to differentiate visually between the object points radiated by the measuring object 20, in this case therefore by the light-emitting diodes, and the background of the surrounding area. In the case of the extracting plant 10, the measuring object 20 is entrained with the extracting machine 6, whilst the detection unit 25 is located in a fixed manner on the shield-type support frame 2. It could be possible for each shield-type support frame 2 in the shield-type support system 1 to be provided with corresponding detection units 25, or for only a smaller number of shield-type support frames 2 to be provided with corresponding detection units 25, a regular or, where applicable, irregular spacing then being able to be provided between the detection units 25. The more detection units 25 that are used, the more accurately it is possible to detect, by way of the evaluation system formed by detection unit 25 and measuring object 20 and a suitable computer or processor along with software, the spacing between them and the extracting machine 6 or the face conveyor 7 and also the tilting of extracting plant 6 or face conveyor 8 in relation to the detection unit 25 or to an arbitrary reference point. The tilting of the extracting plant 6 or of the face conveyor 7 in relation to the horizontal is indicated in FIG. 1 by the angle α. The measuring method used according to the invention is now explained firstly with reference to FIG. 2.

Figure 2:
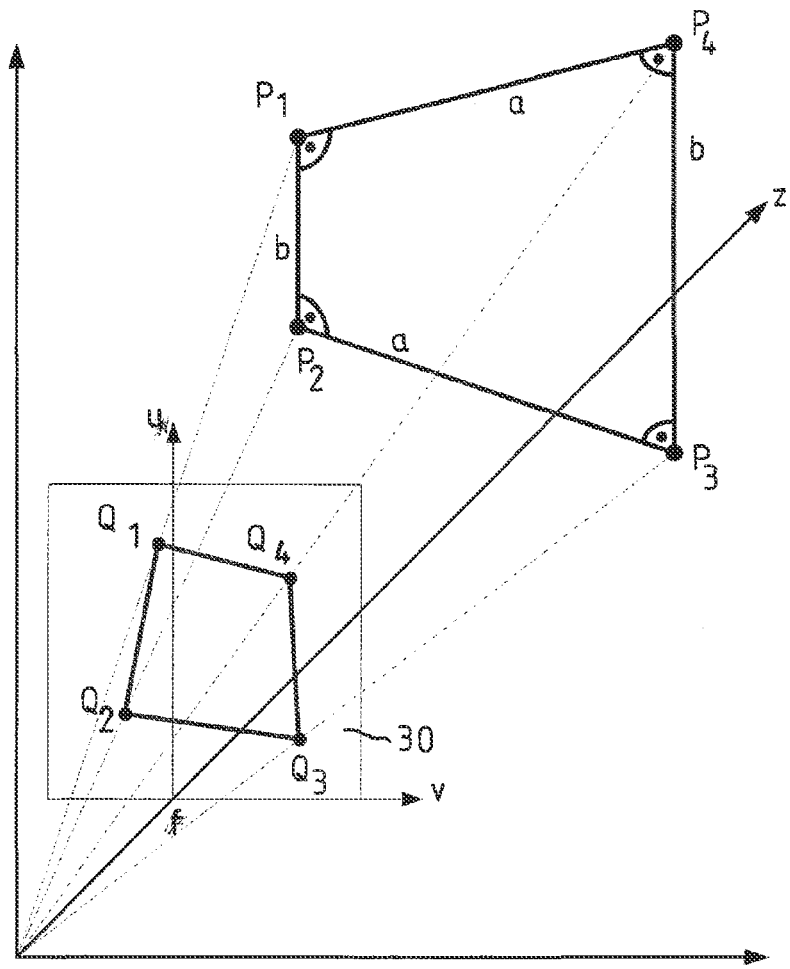
FIG. 2 shows the measuring principle underlying the invention by way of a model.

The perspective projections of space onto the image plane formed by a preferably two-dimensional image sensor 30 can be described using a model shown schematically in FIG. 2 and a reconstruction of the 3D space can be formulated proceeding from its 2D projections. x, y and z are the coordinate axes for the object points of the measuring object P in 3D space (space coordinate system), whilst u and v are the coordinate axes of the image projection Q in 2D space (image coordinate system). f is a parameter that is dependent on the detection unit. In the model in FIG. 2, the origin of the image coordinate system is located in point (0,0,f) of the space coordinate system and the (u,v) plane is aligned parallel to the (x,y) plane. FIG. 2 clarifies the imaging of in this case precisely four object points $P_1, P_2, P_3, P_4$ of a suitable measuring object P onto the image plane of the image sensor 30. The four object points $P_1, P_2, P_3, P_4$ are arranged in this case for simplification such that they span a rectangle with the side lengths a and b. At least four points are required to make the solution clear. The coordinates $(u_i, v_i)$ of the image points $Q_1, Q_2, Q_3, Q_4$, which are detected with progressive scanning using the image sensor 30 such as, for example, a CCD sensor, the parameter f and the side lengths a and b of the rectangle spanned by the measuring object P are known variables.

The following is applicable:

$$a = \sqrt{\left(z_1\frac{u_1}{f} - z_2\frac{u_2}{f}\right)^2 + \left(z_1\frac{v_1}{f} - z_2\frac{v_2}{f}\right)^2 + (z_1 - z_2)^2}$$

$$b = \sqrt{\left(z_2\frac{u_2}{f} - z_3\frac{u_3}{f}\right)^2 + \left(z_2\frac{v_2}{f} - z_3\frac{v_3}{f}\right)^2 + (z_2 - z_3)^2}$$

$$a = \sqrt{\left(z_3\frac{u_3}{f} - z_4\frac{u_4}{f}\right)^2 + \left(z_3\frac{v_3}{f} - z_4\frac{v_4}{f}\right)^2 + (z_3 - z_4)^2}$$

$$b = \sqrt{\left(z_4\frac{u_4}{f} - z_1\frac{u_1}{f}\right)^2 + \left(z_4\frac{v_4}{f} - z_1\frac{v_1}{f}\right)^2 + (z_4 - z_1)^2}$$

This produces the following non-linear system of equation:

$$g_1(z_1, z_2, z_3, z_4) =$$
$$\left(\frac{u_1^2 + v_1^2}{f^2} + 1\right)z_1^2 + \left(\frac{u_2^2 + v_2^2}{f^2} + 1\right)z_2^2 - 2\left(\frac{u_1 u_2 + v_1 v_2}{f^2} + 1\right)z_1 z_2 - a^2 = 0$$

$$g_2(z_1, z_2, z_3, z_4) =$$
$$\left(\frac{u_2^2 + v_2^2}{f^2} + 1\right)z_2^2 + \left(\frac{u_3^2 + v_3^2}{f^2} + 1\right)z_3^2 - 2\left(\frac{u_2 u_3 + v_2 v_3}{f^2} + 1\right)z_2 z_3 - b^2 = 0$$

$$g_3(z_1, z_2, z_3, z_4) =$$
$$\left(\frac{u_3^2 + v_3^2}{f^2} + 1\right)z_3^2 + \left(\frac{u_4^2 + v_4^2}{f^2} + 1\right)z_4^2 - 2\left(\frac{u_3 u_4 + v_3 v_4}{f^2} + 1\right)z_3 z_4 - a^2 = 0$$

$$g_4(z_1, z_2, z_3, z_4) =$$
$$\left(\frac{u_1^2 + v_1^2}{f^2} + 1\right)z_1^2 + \left(\frac{u_4^2 + v_4^2}{f^2} + 1\right)z_4^2 - 2\left(\frac{u_1 u_4 + v_1 v_4}{f^2} + 1\right)z_1 z_4 - b^2 = 0$$

In the following let $\vec{z} = (z_1, z_2, z_3, z_4)$.

The system of equation can be solved, for example, using Newton's multi-dimensional method:
Formulate the Jacobian matrix:

$$J(\vec{z}) = \begin{pmatrix} \frac{\partial g_1}{\partial z_1} & \cdots & \frac{\partial g_1}{\partial z_4} \\ \vdots & \ddots & \vdots \\ \frac{\partial g_4}{\partial z_1} & \cdots & \frac{\partial g_4}{\partial z_4} \end{pmatrix}$$

Select a suitable initial value $\vec{z}_0$.

Carry out iteration: Solve $J(\vec{z}_n)\Delta\vec{z}_n = -g(\vec{z}_n)$ to $\Delta\vec{z}_n$ and form $\vec{z}_{n+1} = \vec{z}_n + \Delta\vec{z}_n$.

Abort method if $\|\vec{z}_{n+1} - \vec{z}_n\|$ is less than a predetermined accuracy value or a predetermined number of iteration steps is reached.

The following applies for the x and y coordinates of the image points:

$$x_i = \frac{u_i}{f} z_i \text{ and } y_i = \frac{v_i}{f} z_i$$

where i=1, 2, 3, 4.

The individual calculation or iteration steps can be carried out with correspondingly suitable microprocessors and software of an evaluation system. The microprocessor can be, for example, a component of a higher-ranking face control system, a component in each case of a support control device, a component of a control device that is entrained with the extracting machine, or can be accommodated in a separate control and evaluation computer.

Using the afore-described measuring method, it is consequently possible to determine the location of a measuring object in 3D space from its projections onto an image plane in two-dimensional space. The reconstruction of the coordinates of the object points $P_1, P_2, P_3, P_4$ on the image points is certainly not trivial, as a non-linear system of equation has to be solved; however, by using numerical solution methods this does not present any problems especially when suitable microprocessors and software are made available.

A first possibility for implementing this method has already been described schematically in FIG. 1 by way of the extracting plant 10, a measuring object 20 being scanned here by way of a plurality of detection units 25 as it is moved past. The greater the spacing between object points 21 at the measuring object 20 in this case, the more accurately the actual position and location of the extracting machine 6 or of the trough pans 7 of the face conveyor 8 are able to be reconstructed from the spacing between the image points Q.

A camera can be used in particular as detection unit 25, as is represented in FIG. 1. However, any other detection unit using a suitable image sensor as detector can be used. The image sensors are preferably two-dimensional matrix sensors such as CCD or CMOS. The image sensor and the lens used, insofar as present, are matched to the wavelength range of the object points. The object points can radiate not only within the visible, but also within the infrared or ultraviolet ranges and can be VIS-LEDs, UV-LEDs, IR-LEDs or other radiation sources, the image sensor then being correspondingly matched to the detection of the same. Along with active radiation sources such as LEDs, it is also possible to scan other object points, there having to be a sufficient contrast between the object points to be scanned and the surrounding region or background region.

Figure 3:
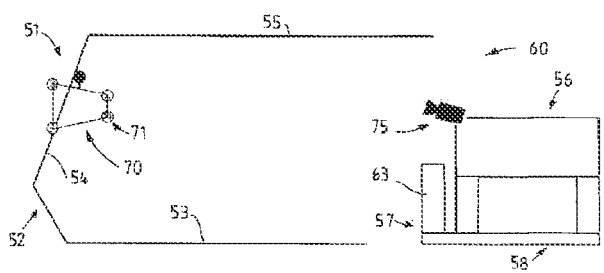
FIG. 3 shows an extracting plant according to a second embodiment variant.

FIG. 3 shows a first possible alternative method variant. FIG. 3 shows a schematic representation similar to that in FIG. 1 of an extracting plant 60, which once again includes a shield-type support system 51 having a plurality of shield-type support frames 52 set up adjacent to each other for keeping an underground face open. An extracting machine 56 is displaceable along a face conveyor 58, of the individual trough pans 57 of the face conveyor 58 only the trough pan 57 positioned directly in front of the shield-type support frame 52 being represented together with its side spill plate 63 on the goaf side, i.e. facing the shield-type support frame 52. The face conveyor 58 can be, in particular, a scraper chain conveyor, by way of which the material is removed independently of the movement of the extracting machine 56. In the case of the extracting plant 60, a detection unit 75 is secured to the extracting machine 56 and is displaced back and forth in the face with the extracting machine. In each case at least one measuring object 70 with at least four object points 71, as shown schematically in FIG. 3, is secured to individual or to all shield-type support frames 52. By way of the image sensor in the detection unit 75, formed in this case once again by a camera, the visual signal emitted by the object points 71 is detected and recorded as a projection in order to detect herefrom, as explained with reference to FIG. 2, the actual spacing and the degree of tilting of the extracting machine 56 in relation to the shield-type support frame 52. The measuring object 70 is represented symbolically here as a crooked square, as is actually recorded by way of the image sensor of the detection unit 75. The measuring object 70 can comprise, for example, four LEDs secured at a predetermined spacing and at right angles to each other on the fracture shield 54 of the shield-type support frame 52. However, the measuring object 70 can also be secured at another position, for example on the shield cap 55 or the horizontal runner 53. It is advantageous if at least all object points 71 of a measuring object 70 are secured to the same machine part, in this case therefore to the fracture shield 54, as then a rigid, fixed relationship of the object points 71 to one another remains ensured. At the same time care must be taken to ensure that when moving past, the four measuring object points 71 can certainly be detected simultaneously at a specific point in time by way of the detection unit 75 without hose cabling or the like interfering with the detection of the object points 71 by the detection unit 75.

Figure 4:
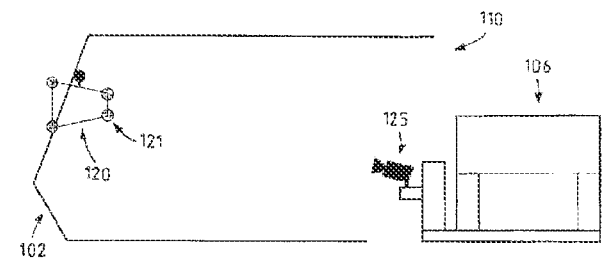
FIG. 4 shows an extracting plant according to a third embodiment variant.

FIG. 4 shows a further possible method variant of an extracting plant 110, which once again includes shield-type support frames 102, an extracting machine 106 and a face conveyor 108. In the case of the extracting plant 110, as with the preceding exemplary embodiment, the measuring object 120 with the object points 121 is secured on the shield-type support frame 102 in a fixed manner. Depending on the time and money spent on the measuring process and on the desired accuracy, each shield-type support frame 102 can be provided with a corresponding measuring object 120 at the same position and in the same alignment, or only a few of the shield-type support frames 102 are provided with corresponding measuring objects 120. A detection unit 125 is also moved back and forth in the face in the case of the extracting plant 110, in this case, however, independently of the extracting machine 106. The detection unit 125 could be secured, for example, on a separate guide and could be moved back and forth by way of a separate drive to scan the measuring objects 120 in each case during its movement and then to detect from the object signals, i.e. the projections on the image sensor in the detection unit 125, the spacing and the location of the face conveyor 108 in relation to the shield-type support frame 102.

Figure 5:
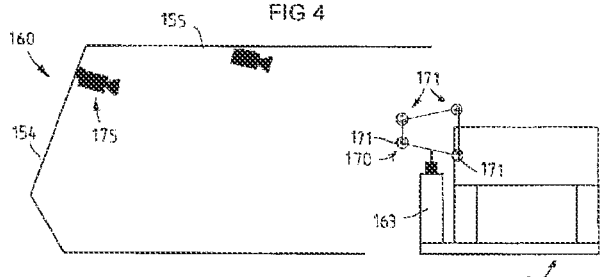
FIG. 5 shows an extracting plant according to a fourth embodiment variant.

In the case of the extracting plant 160 shown in FIG. 5, both fixed detection units 175 and fixed measuring objects 170, once again in this case with four object points 171, are used. The detection unit 175 is secured in a fixed manner on the shield-type support frame 152, for example on the fracture shield 154, as represented, or also in a suitable position on the shield cap 155, as shown. The measuring object 170 is located preferably over as large a surface as possible on the side spill plate 163 of the face conveyor 158. To this end, two of the object points 171 can be positioned, for example, close to the bottom and two further object points 171 close to the upper edge of the side spill plate 163. The position also depends on the position of the detection unit 175 on the shield-type support frame 152, it being necessary that the optical waves of the object points 171 are not disturbed by rock or the like lying around in the direction of the optical system of the detection unit 175. In the case of the exemplary embodiment in FIG. 5, a detection unit 175 can be associated in each case with a measuring object 170. However, it would also be possible either to secure the detection unit 175 so as to be pivotable on the shield-type support frame 152, or to use a detection unit 175 that has a pivotable lens in order, in dependence on the pivotal position of the lens, to detect another region. Using such a detection unit 175 that is either pivotable or includes a pivotable optical system, it would be possible to detect not only one measuring object 170, but a plurality of measuring objects 170. It would also be possible as an option to locate a plurality of measuring objects 170 on the same machine part, in this case, for example, on the spill plate 163 of the same trough pan, or it would be possible to scan measuring objects 170 that are mounted, for example, on adjacent trough pans. It would then be possible to scan an entire shield-type support system along the face using a smaller number of detection units.

Figure 6:
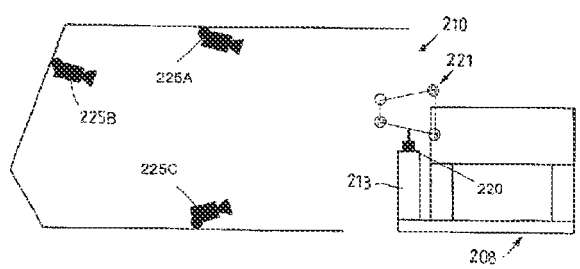
FIG. 6 shows an extracting plant according to a fifth embodiment variant.

In the case of the extracting plant 210 in FIG. 6, similarly to the preceding exemplary embodiment, at least one measuring object 220 with object points 221 is secured in each case to the spill plate 213 of a face conveyor 208. The measuring objects 220 are once again associated in a fixed manner with each or at least individuals of the trough pans of the face conveyor 208. The same measuring object 220 is not detected by way of one, but in this case by way of a plurality of detection units 225A, 225B, 225C, it being possible to ensure thereby, for example, that even when one of the detection units 225 fails or has its free view of the measuring object 220 obstructed, at least one further detection unit 225 still supplies a measuring signal that can be evaluated for determining the spacing and the location.

Figure 7:
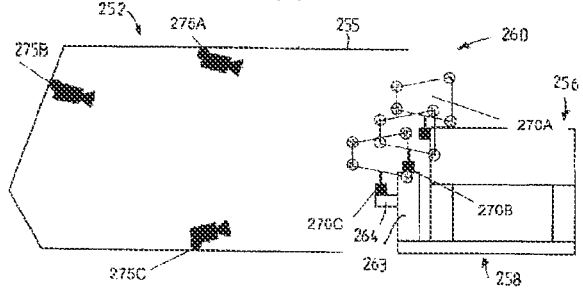
FIG. 7 shows an extracting plant according to a sixth embodiment variant.

In the case of the extracting plant 260 in FIG. 7, similarly as in the preceding exemplary embodiment, once again three detection units 275A, 275B, 275C located at different positions on the shield-type support frame 252 are used. Each detection unit 275A, 275B, 275C has associated therewith a separate measuring object 270A, 270B, 270C. The measuring object 270C can be displaced, for example, independently of the extracting machine 256 along a guide device 264 on the spill plate 263. Each spill plate 263 can be additionally provided with a fixed measuring object 270B, the signals of which are detected by way of the camera 275B. A measuring object 270A is detected by way of the detection unit 275A positioned on the shield cap 255, which measuring object is displaced in the face together with the extracting machine 256. In the case of the extracting plant 260, the time and money spent on data is correspondingly higher, as sometimes at a certain point in time, for the relationship between shield-type support frame 252 and face conveyor 258, a plurality of signals or signal pairs have to be evaluated by detection unit 275A and associated measuring object 270A etc.

Figure 8:
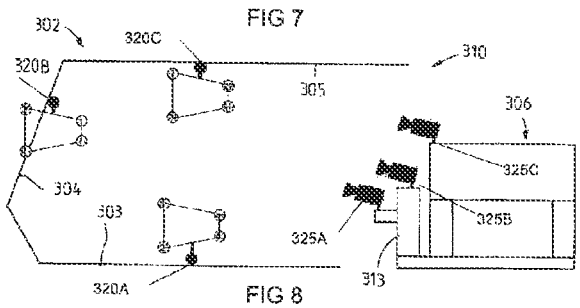
FIG. 8 shows an extracting plant according to a seventh embodiment variant.

In the case of the extracting plant 310 in FIG. 8, similarly to in the preceding exemplary embodiment, three detection units 325A, 325B, 325C and three measuring objects 320A, 320B, 320C are used which, in this case, however, are positioned at different positions, namely floor runner 303, fracture shield 304 and shield cap 305 of the shield-type support frame 302. The signal of one measuring object 320A, 320B, 320C is scanned in each case by way of a separate detection unit 325A, 325B, 325C. In this case too, a detection unit 325A with a fixedly associated measuring object 320A forms an evaluation pair. The detection unit 325A can be displaced independently of the extracting machine 306, the detection unit 325B is located in a fixed manner on the spill plate 313 and the detection unit 325C is displaced with the extracting machine 306.

Figure 9:
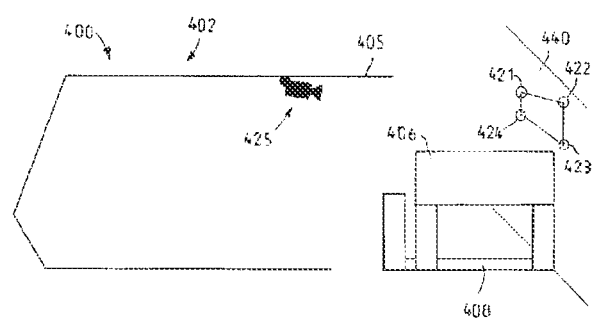
FIG. 9 shows an extracting plant according to an eighth embodiment variant.

FIG. 9 shows a further modified exemplary embodiment of an extracting plant 410 according to the invention. A detection unit 425, which can also be directed at least onto the face 440, is secured to a shield-type support frame 402 of a shield-type support system (not shown any further), for example on the shield cap 405. The detection unit, in this case, is secured in a fixed manner to the shield-type support frame 402, but, for example, could also be pivotable in order to fulfil different tasks with the same detection unit 425 or to scan different regions. The extracting machine 406 moves between the shield-type support frame 402 and the face on a face conveyor 408 which is displaceable by means of a displacing beam (not shown). Using the detection unit 425 it is possible to detect measuring objects 421, 422, 423, 424 which are not on a measuring object but, in this case, are predetermined by natural object points on the face, for example elevations on the face, reflective mineral accumulations, open spaces in the rock, stone chippings or the like.

In active operation, each shield-type support frame 402 is removed for the automatic retreating operation and advanced with the displacing beam, once the extracting machine 406 has moved past and, for example, a certain number of support frames has been moved forward. In a first scanning step before the removal and in a second scanning step at best once the support frame 402 has been set, the measuring objects 421, 422, 423, 424 can then be scanned by way of the detection unit 425. Insofar as the detection unit 425 has not been moved in relation to the support frame between the scanning steps, from the projection of the detected measuring objects a change in the location and a change in the position of the detection unit 425 in relation to the face 440 can be detected by way of the four natural measuring objects 421-424 fixed thereto. From the change in the position and location data of the detection unit, once again, the change in position and location of the plant component 402 provided with the detection unit 425 between the two scanning steps can be deduced and from this, for example, can be determined how the plant component and consequently also the entire extracting plant has migrated within the region of the associated detection unit 425. Distributed over the face, only individual support frames could be provided in each case with a detection unit. The respective data could, however, also be recorded by means of a detection unit that is displaceable along the extracting plant, by the detection unit briefly stopping, for example, until the advancing operation is completed. The spacing between the measuring objects can vary from measuring operation to measuring operation and the absolute spacing does not need to be known, but it must not change between one measuring operation but must maintain the (naturally) predetermined spacing at least over the associated scanning steps. The measuring objects or object points can, in principle, be arbitrary and can also be present or marked on the roof and at other places in the surrounding area.

Numerous modifications that are to fall within the scope of protection of the attached claims are produced from the preceding description. It is obvious that individual method variants can also be combined together. It has already been mentioned that the measuring objects can also include more than four object points. The display of a control device entrained, for example, with the extracting machine or the display of a support control can also be used as a measuring object. Individual shield-type support frames and/or trough pans can be provided with neither detection units nor measuring objects and other shield-type support frames or detection units can also include in each case a plurality of measuring objects and/or a plurality of detection units.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A method for determining at least one of a position or a location of a plant component in a mining extracting plant the method comprising:
    using an evaluation system comprising a detection unit having an image sensor to receive, onto the image sensor, a projection of at least four object points located on at least one measuring object associated with the plant component, the at least four object points having a predetermined spacing from each other and being detectable within at least one of a visible wavelength range, an ultra-violet wavelength range, or an infra-red wavelength range;
    recording positional data of the at least one measuring object as projected onto the image sensor;
    calculating coordinates of the plant component in a three-dimensional space based upon the positional data received from the projection of the at least four object points onto the image sensors; and
    determining the position or the location of the plant component based upon the coordinates calculated in three-dimensional space,
    wherein the plant component comprises one of:
        at least one face conveyor for removing extracted materials,
        a shield-type support system having a plurality of shield-type support frames configured to keep a face open,
        displacing devices configured to move the at least one face conveyor and the shield-type support system in active operation, and
        an extracting machine moveable along the face conveyor, and
    wherein the at least four object points of the at least one measuring object are moved along the face conveyor independently of the extracting machine and are detected by way of a plurality of detection units located along one or more of the shield-type support frames of the shield-type support system in a fixed manner.

2. The method according to claim 1, wherein the at least four object points of the at least one measuring object are connected to the extracting machine and are detected by way of a plurality of detection units located along the shield-type support system in a fixed manner.

3. The method according to claim 2, wherein the at least one measuring object is formed by a display of a display device or control device located on the extracting machine.

4. The method according to claim 1, wherein the at least four object points of the at least one measuring object are located along the face conveyor in a fixed manner and are detected by way of a plurality of detection units located along one or more of the shield-type support frames of the shield-type support system in a fixed manner.

5. The method according to claim 1, wherein the at least four object points of a plurality of fixed measuring objects located along the shield-type support system are detected by way of at least one detection unit connected to the extracting machine.

6. The method according to claim 1, wherein at least one of the detection units and an optical system associated with the image sensor of the detection units is pivoted.

7. The method according to claim 1, wherein at least one of the detection units and measuring objects located along the face conveyor is located on a spill plate on the goaf side of the face conveyor.

8. The method according to claim 1, wherein the at least four object points of the at least one measuring object are composed of light emitting diodes radiating within at least one of the visible wavelength range, the ultra-violet wavelength range, or the infra-red wavelength range, the at least four object points being at least one of positioned at a predetermined spacing from each other and located on the same machine part of the plant component.

9. The method according to claim 1, wherein at least one selected from the group of measuring objects and detection units is located at different positions on at least one or more of the shield-type support frames of the shield-type support system and a trough pan of the face conveyor, wherein one measuring object and one detection unit forms an evaluation pair.

10. The method according to claim 1, wherein the at least one detection unit includes a plurality of detection units located on at least one or more of the shield-type support frames of the shield-type support system at different positions or located on a trough pan of the face conveyor at different positions, wherein at least two of the plurality of detection units are configured to detect the same measuring object.

11. The method according to claim 1, wherein the location coordinates or position coordinates of one of the plant components is determined in iteration steps by way of an evaluation device from the projections of the object points detected by way of the image sensors.

12. A coal mining extracting plant comprising:
a plurality of plant components, the plant components comprising:
  a face conveyor configured to remove extracted materials,
  a shield-type support system having a plurality of shield-type support frames configured to keep a face open,
  displacing devices configured to move the face conveyor and the shield-type support system during active operation, and
  an extracting machine; and
an evaluation system comprising at least one detection unit, the at least one detection unit comprising an image sensor, the evaluation system configured to:
  receive, onto the image sensor, a projection of at least four object points located on one or more measuring objects associated with the plant component, the at least four object points having a predetermined spacing from each other and being detectable within at least one of a visible wavelength range, an ultra-violet wavelength range, or an infra-red wavelength range;
  record positional data of the one or more measuring objects as projected onto the image sensor;
  calculate coordinates of the plant component in a three-dimensional space based upon the positional data received from the projection of the at least four object points onto the image sensors; and
  determine a position or a location of at least one of the plant components based upon the coordinates calculated in three-dimensional space,
  wherein at least one plant component has associated therewith at least one inclination detector, the signals of which are at least one of configured to be supplied to the evaluation system and configured to be evaluated by way of the evaluation system, and wherein the at least one inclination detector includes a plurality of acceleration sensors.

13. The extracting plant according to claim 12, wherein the evaluation system includes image processing software, by way of which at least one of the position or the location of the plant component is determinable from the projection of the at least four object points detected by way of the image sensor.

14. The extracting plant according to claim 12, wherein at least one of the detection units and an optical system associated with the image sensor of the detection units is pivotable.

15. The extracting plant according to claim 12, wherein at least one of the detection units and the one or more measuring objects located along the face conveyor are located on a spill plate on the goaf side of the face conveyor.

16. The extracting plant according to claim 12, wherein the at least four object points of the one or more measuring objects are composed of light emitting diodes radiating within one or more of the visible wavelength range, the ultra-violet wavelength range, or the infra-red wavelength range, the at least four object points being at least one of positioned at a predetermined spacing from each other and located on the same machine part of one of the plant components.

17. The extracting plant according to claim 12, wherein at least one selected from the group of the measuring objects and the at least one detection unit is located at different positions on at least one or more of the shield-type support frames of the shield-type support system and on a trough pan of the face conveyor, wherein one measuring object and one detection unit forms an evaluation pair.

18. The extracting plant according to claim 12, wherein the at least one detection unit includes a plurality of detection units located on at least one or more of the shield-type support frames of the shield-type support system at different positions or located on a trough pan of the face conveyor at different positions, wherein at least two of the plurality of detection units are configured to detect the same measuring object.

19. The extracting plant according to claim 12, wherein location coordinates or position coordinates of one of the plant components is determined in iteration steps by way of an evaluation device from the projections of the object points detected by way of the image sensors.

20. The method according to claim 4, wherein natural object points at the face to be extracted by way of the extracting machine are detected.

21. The method according to claim 4, further comprising detecting a migration of the extracting plant.

22. A method for determining at least one of a position or a location of a plant component in a mining extracting plant the method comprising:
- using an evaluation system comprising a detection unit having an image sensor to receive, onto the image sensor, a projection of at least four object points located on at least one measuring object associated with the plant component, the at least four object points having a predetermined spacing from each other and being detectable within at least one of a visible wavelength range, an ultra-violet wavelength range, or an infra-red wavelength range;
- recording positional data of the at least one measuring object as projected onto the image sensor;
- calculating coordinates of the plant component in a three-dimensional space based upon the positional data received from the projection of the at least four object points onto the image sensors; and
- determining the position or the location of the plant component based upon the coordinates calculated in three-dimensional space,
- wherein the plant component comprises one of:
  - at least one face conveyor for removing extracted materials,
  - a shield-type support system having a plurality of shield-type support frames configured to keep a face open,
  - displacing devices configured to move the at least one face conveyor and the shield-type support system in active operation, and
  - an extracting machine moveable along the face conveyor; and
- wherein the at least four object points of a plurality of fixed measuring objects located along the shield-type support system are detected by way of at least one detection unit moved along the face conveyor independently of the extracting machine.

23. A method for determining at least one of a position or a location of a plant component in a mining extracting plant the method comprising:
- using an evaluation system comprising a detection unit having an image sensor to receive, onto the image sensor, a projection of at least four object points located on at least one measuring object associated with the plant component, the at least four object points having a predetermined spacing from each other and being detectable within at least one of a visible wavelength range, an ultra-violet wavelength range, or an infra-red wavelength range;
- recording positional data of the at least one measuring object as projected onto the image sensor;
- calculating coordinates of the plant component in a three-dimensional space based upon the positional data received from the projection of the at least four object points onto the image sensors; and
- determining the position or the location of the plant component based upon the coordinates calculated in three-dimensional space,
- wherein the plant component comprises one of:
  - at least one face conveyor for removing extracted materials,
  - a shield-type support system having a plurality of shield-type support frames configured to keep a face open,
  - displacing devices configured to move the at least one face conveyor and the shield-type support system in active operation, and
  - an extracting machine moveable along the face conveyor; and
- wherein the at least four object points of a plurality of fixed measuring objects located along the shield-type support system are detected by way of a plurality of detection units located along the face conveyor in a fixed manner.

24. A method for determining at least one of a position or a location of a plant component in a mining extracting plant the method comprising:
- using an evaluation system comprising a detection unit having an image sensor to receive, onto the image sensor, a projection of at least four object points located on at least one measuring object associated with the plant component, the at least four object points having a predetermined spacing from each other and being detectable within at least one of a visible wavelength range, an ultra-violet wavelength range, or an infra-red wavelength range;
- recording positional data of the at least one measuring object as projected onto the image sensor;
- calculating coordinates of the plant component in a three-dimensional space based upon the positional data received from the projection of the at least four object points onto the image sensors; and
- determining the position or the location of the plant component based upon the coordinates calculated in three-dimensional space,
- wherein the plant component comprises one of:
  - at least one face conveyor for removing extracted materials,
  - a shield-type support system having a plurality of shield-type support frames configured to keep a face open,
  - displacing devices configured to move the at least one face conveyor and the shield-type support system in active operation, and
  - an extracting machine moveable along the face conveyor; and
- wherein at least one plant component has associated therewith at least one inclination detector, the signals of which are at least one of suppliable to the evaluation system and can be evaluated by way of the evaluation system, wherein the inclination detector includes a plurality of acceleration sensors.

25. The method according to claim 23, further comprising determining the change in the at least one of the position or the location of the plant component from the projection of the at least four object points detected by way of the image sensor.

26. The method according to claim 23, wherein natural object points at the face to be extracted by the extracting machine are detected.

27. The method according to claim 23, wherein a migration of the mining extracting plant is detected by determining the change in position and the location of the plant component.

* * * * *